United States Patent [19]

Heiner

[11] Patent Number: 5,626,361
[45] Date of Patent: May 6, 1997

[54] ROLL-OVER PROTECTION ARRANGEMENT FOR A MOTOR VEHICLE

[75] Inventor: Lothar Heiner, Munich, Germany

[73] Assignee: Bayerische Motoren Werke AG, Munich, Germany

[21] Appl. No.: 555,501

[22] Filed: Nov. 8, 1995

Related U.S. Application Data

[63] Continuation of Ser. No. 237,102, May 3, 1994, abandoned.

[30] Foreign Application Priority Data

May 3, 1993 [DE] Germany ............... 43 14 538.8

[51] Int. Cl.$^6$ ................................................. B60R 21/00
[52] U.S. Cl. ............................................... 280/756; 296/63
[58] Field of Search ........................... 280/756; 296/1.1, 296/63, 69, 99.1, 107; 297/403, 410

[56] References Cited

U.S. PATENT DOCUMENTS

| | | | |
|---|---|---|---|
| 3,292,726 | 12/1966 | Jette, Jr. | 280/756 |
| 4,840,398 | 6/1989 | Matthias et al. | 280/756 |
| 4,907,735 | 3/1990 | Ushioda et al. | 280/756 |
| 5,056,816 | 10/1991 | Lutze et al. | 280/756 X |
| 5,110,185 | 5/1992 | Schmulte et al. | 280/756 |
| 5,199,526 | 4/1993 | Derviller | 280/756 |

FOREIGN PATENT DOCUMENTS

| | | | |
|---|---|---|---|
| 0459213A1 | 12/1991 | European Pat. Off. | |
| 0459213 | 12/1991 | European Pat. Off. | 280/756 |
| 0500261A1 | 8/1992 | European Pat. Off. | |
| 0504482 | 9/1992 | European Pat. Off. | 280/756 |
| 1805449 | 5/1970 | Germany. | |
| 3822461C2 | 1/1990 | Germany. | |
| 3905470A | 12/1990 | Germany. | |
| 3905470A1 | 12/1990 | Germany. | |
| 3927265A | 2/1991 | Germany. | |
| 3930171A1 | 3/1991 | Germany. | |
| 4017778A | 12/1991 | Germany. | |
| 3822461 | 5/1992 | Germany. | |
| 6040299 | 2/1994 | Japan | 280/756 |

OTHER PUBLICATIONS

Search Report Jul. 10, 1996 Europe.

*Primary Examiner*—Christopher P. Ellis
*Attorney, Agent, or Firm*—Evenson McKeown Edwards & Lenahan, PLLC

[57] ABSTRACT

A roll-over protection arrangement is provided which comprises an approximately U-shaped roll-over bar which can be translationally moved upward and back and which, by means of its downwardly directed legs, is guided by means of guiding elements in a housing. By means of the effect of springs, the roll-over bar can be rapidly changed from its inoperative position which projects hardly beyond the vehicle railing into a supporting position which projects clearly upward beyond the vehicle railing. In order to reduce the overall weight of the installed components as well as of the installed ejecting springs, almost all parts of the roll-over protection arrangement, including at least the legs of the roll-over bar and guiding elements therefor are made of extruded profiles.

30 Claims, 3 Drawing Sheets

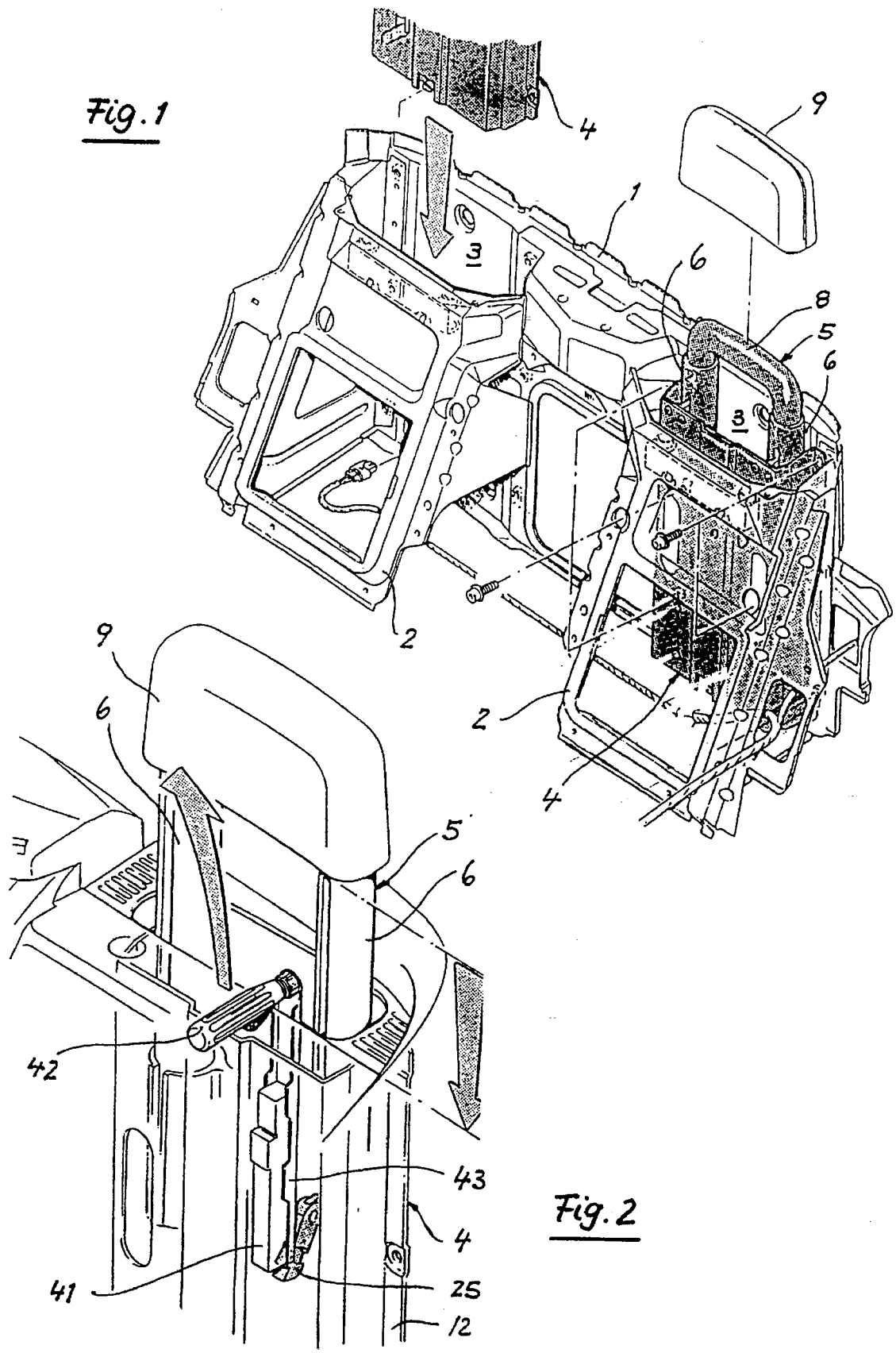

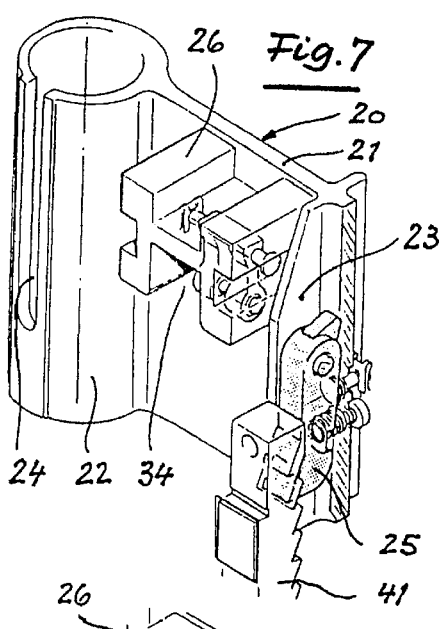
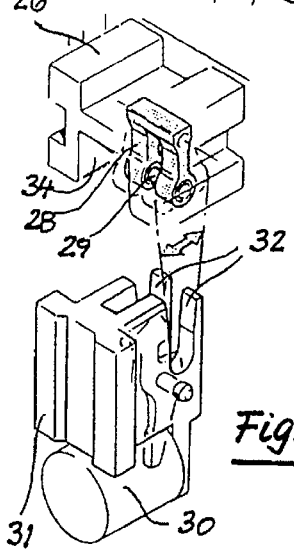
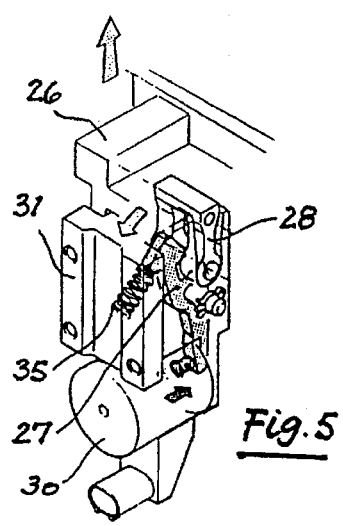
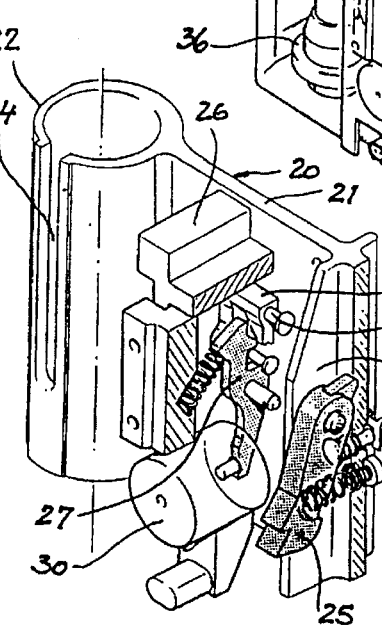
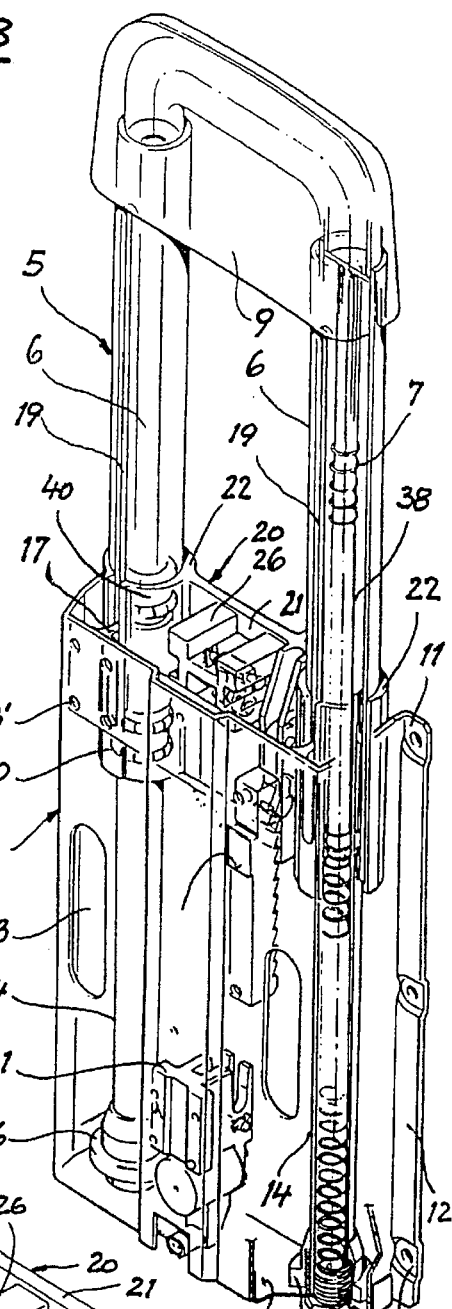

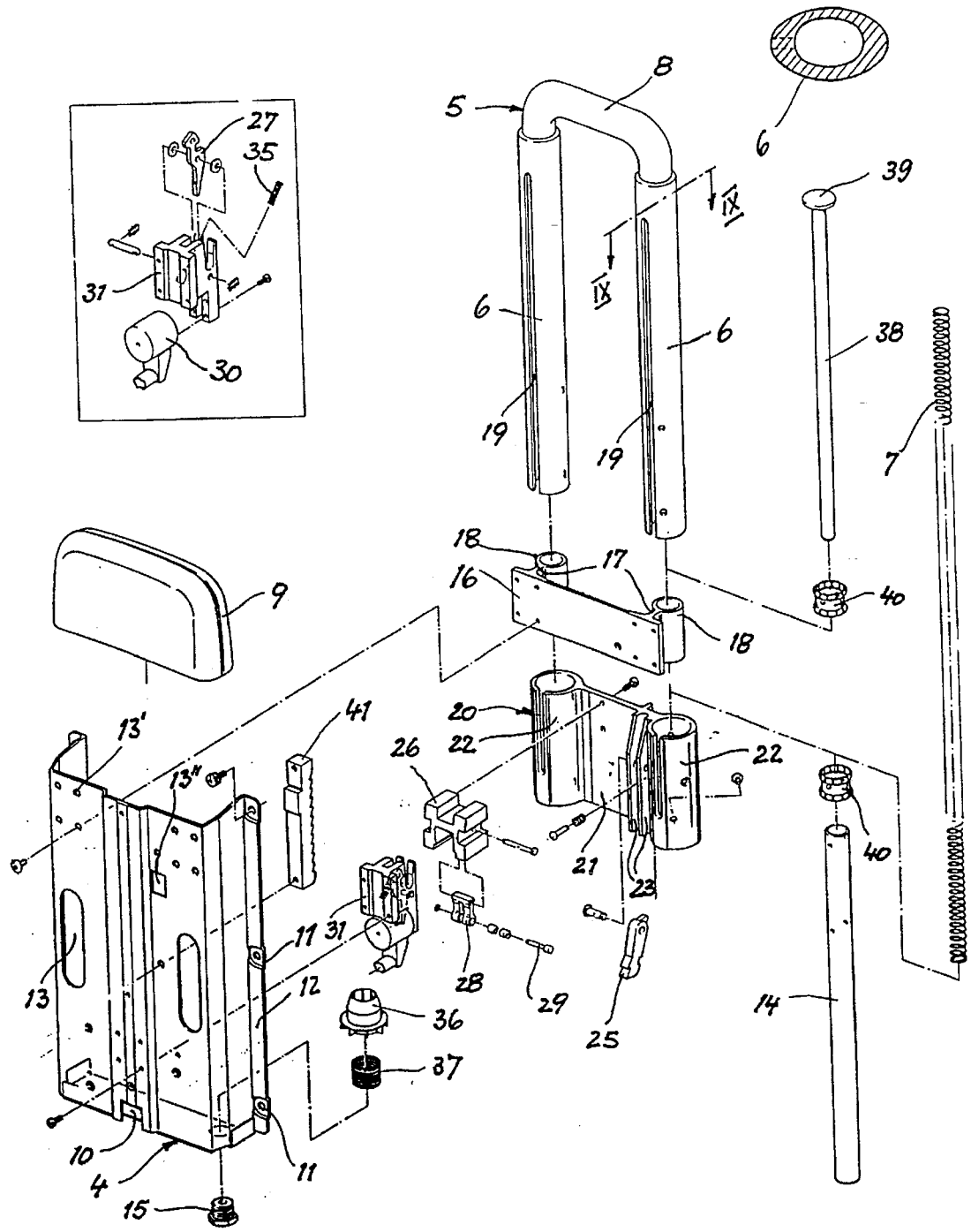

ROLL-OVER PROTECTION ARRANGEMENT FOR A MOTOR VEHICLE

This application is a continuation of application Ser. No. 08/237,102, filed on May 3, 1994, now abandoned.

BACKGROUND AND SUMMARY OF THE INVENTION

The invention relates to a roll-over protection arrangement for a motor vehicle including a selectively movable roll-over bar guided for vertical translational movement between an inoperative lower position and an operative upper position.

Several roll-over protection devices of this type are known, for example, from U.S. Patent Document U.S. Pat. No. 3,292,726, German Patent Document DE-C-38 22 461 and German Patent Document DE-A-39 27 265.

To the extent that roll-over bars have become known in practice, for example, in the case of passenger cars but also in the case of tractors, they are manufactured from high-strength steel, partially with the use of steel tubes and partially with the use of sheet metal half-shells. This method of construction requires high expenditures and costs. The used structural elements are also heavy which is not only basically undesirable but also requires particularly strong driving devices for the fast moving-out of the roll-over bars so that the relatively heavy bars can be brought into their supporting position within a very short period of time.

It is an object of the invention to provide a roll-over protection device of the above-mentioned type which is not only relatively light but can also be manufactured at reasonable cost and, if necessary, can also easily be adapted to different vehicles.

According to the invention, this object is achieved in that at least the legs of the roll-over bar and the guiding elements consist of extruded profiles.

As a rule, extruded profiles are made of aluminum alloys or similar comparable materials. The manufacturing expenditures are relatively low. Nevertheless, high-strength structural elements can be manufactured which have a low weight. As will be explained in detail in the following, by means of the consequent use of extruded profiles and by a skillful nesting of these profiles in one another, a roll-over protection system can be provided which, also because of the smaller masses to be accelerated in the case of a roll-over, requires lower-strength springs which, in turn, results in a weight reduction.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective schematic view of a part of a roll-over protection arrangement with the adjoining sheet metal parts of a passenger car body constructed according to a preferred embodiment of the invention;

FIG. 2 is a corresponding, slightly enlarged partial view of one of the roll-over bar assemblies of FIG. 1, also showing outlined covering parts;

FIG. 3 is a further view of a roll-over protection device with a moved-out bar from the arrangement of FIG. 1;

FIG. 4 is an enlarged representation of a detail of the holding device for a moved-in roll-over bar of the arrangement of FIG. 1;

FIG. 5 is a partial schematic perspective view of a cutout of FIG. 4, shown approximately at a point in time of the releasing of the holding device;

FIG. 6 is a view of the released holding device of FIG. 5;

FIG. 7 is a view of a locking device for the moved-out roll-over bar of FIGS. 1 and 3;

FIG. 8 is an exploded perspective view showing the piece parts of the roll-over protection arrangement of FIG. 1; and FIG. 9 is a sectional view according to Line IX—IX in FIG. 8.

DETAILED DESCRIPTION OF THE PREFERRED EMBODIMENTS

FIG. 1 of the drawing illustrates a bulkhead 1 of a convertible which is arranged to extend approximately vertically behind the rear seats in the vehicle body. Schematically depicted at line 1A in FIGS. 1 and 3, is a vehicle railing which surrounds the passenger seat area and defines an upper edge of the open convertible body during driving conditions with the top down. Between this bulkhead 1 and sheet metal frame parts 2 which are directed downward toward the front for the support of rear seats, a space 3 is created which is accessible from above and which in each case is used for receiving a left and a right cassette-type housing 4. In each housing 4, a U-shaped roll-over bar is received in a translationally displaceable manner which can be displaced from a lowered inoperative position illustrated in FIG. 1 into a supporting position which projects upward beyond the vehicle railing level 1A, as illustrated in FIG. 3 for one of the two roll-over bars. From the supporting position, it can be manually moved back into the inoperative position after the release of a locking device. The two roll-over bars for the respective rear seats as shown in FIG. 1, are similar, and therefore, the following description will be for one of these roll-over bars.

After the release of a holding device fixing the roll-over bars 5 in the inoperative position, the approximately vertically directed legs 6—controlled by a roll-over sensor—are pushed under the effect of springs 7 in tenths of a second so far out of the housing and locked that they can carry out their protective function required for the case of a roll-over. The two legs 6 are connected with one another by means of a transversely extending web 8, forming an upward bridging portion, over which an upholstered covering 9 is pushed.

The legs 6 of the roll-over bar 5 and essentially all guiding elements of the roll-over protection arrangement consist of extruded profiles. The guiding elements, which will be explained later in detail, are arranged on the housing 4 which essentially is also formed from an extruded profile. The housing 4 has a flat U-shaped cross-section which is open toward the vehicle wall 1 and is closed off on the bottom by a housing floor 10. The formed-out portions 11 on laterally projecting fastening edges 12 are formed simultaneously with the punching-out of the various openings 13, 13' of the housing 4.

For the guiding of the roll-over bars 5, the stand pipes 14 are provided which can be recognized particularly in FIGS. 3 and 8 and which have an internal thread on their lower end and are screwed to the housing floor 10 by means of suitable screw threaded connections 15. The stand pipes 14 are also produced by extruding. On their upper end, they are held by a transverse plate 16 arranged on the housing 4—also made of an extruded profile—which, by way of a connecting web 17, carries two receiving bushes 18 for the horizontal supporting of the stand pipes 14.

On their side facing the transverse plate 16, the legs 6 of each roll-over bar 5 are provided with longitudinal slots 19 for the passing-through of the connecting webs 17. The lower ends of the legs 6 of each roll-over bar 5 are firmly connected with one another by means of a transverse yoke 20 by means of which a very high stability of the bars is achieved, for example, against a widening of the leg ends, particularly also with respect to the torsional stability. The transverse yoke 20 is screwed to the legs 6 and also consists of an extruded profile. On both ends of a transverse web 21 of the transverse yoke 20, receiving bushes 22 are provided which firmly enclose the ends of the legs 6 and are screwed to these ends. Along a large portion of their length, the receiving bushes 22 are provided with slots 24 which are open toward the top and which overlap with the slots 19 of the legs 6.

Vertically extending cheeks 23 for the bearing of a spring-loaded detent pawl 25 are also arranged on the transverse web 21 of the transverse yoke 20.

As illustrated particularly in FIGS. 4 and 7, a holding block 26 is also arranged on the transverse web 21 of the transverse yoke 20, at which holding block 26 a holding bolt or latch member 27 can engage which is disposed in a housing 4. In the case of the illustrated embodiment, a holding rocker 28 is disposed for this purpose on the holding block 26, can be swivelled about a transverse axis and has a transverse pin 29 to which the holding latch member 27 can be applied.

The above-mentioned holding latch member 27 is disposed in a holding console 31 which can be fastened to the housing 4 and carries an actuator 30. This holding console 31 has slots for the entering of the lower end of the holding rocker 28 which are open toward the top and widen toward the top. Therefore, when the roll-over bar 5 is slid in manually, a secure entering of the rocker into the console supporting the holding bolt 27 can also be ensured when also the housing 4 is deformed, for example, warped, because of low vehicle body movements. The slots 32 are formed with two vertically extending ribs 33 of the holding console 31 made of an extruded profile which, when the roll-over bar 5 is lowered, engage in a passage 34 of the holding block 26 which is open toward the bottom (FIGS. 5 to 7).

The holding latch member 27, which was mentioned several times above, is loaded by a spring 35 into its locking position which is illustrated in FIG. 4. The roll bar can be brought into this locking position by being slid in manually. The holding rocker 28 which, in this case, is guided in the expanding slots 32, moves against a stop slope of the holding latch member 27 and moves the holding latch member 27 with its upper end to the side until the transverse pin 29 enters into the holding recess of the holding latch member 27. For the sensor-controlled release of the roll-over bars 5, the actuator 30 displaces the lower end of the holding latch member 27 in the direction of the transverse web 21 of the transverse yoke 20 against the effect of the spring 35. As soon as the transverse pin 29 is free of the locking latch member 27, the springs 7 will accelerate the roll-over bar 5 in the upward direction.

FIGS. 3 and 8 illustrate centering cones 36 which are slidable on the lower ends of the stand pipes 14 and which are loaded in the upward direction under the effect of a shorter helical spring 37. On the one hand, the centering cones 36 center the lower ends of the slid-in roll-over bars 5; on the other hand, they together also cause a bent characteristic spring curve in the sense that the opening by the actuator 30 is improved and the initial acceleration during the sliding-out of the roll-over bar 5 is increased.

FIGS. 3 and 8 also illustrate that the ejecting springs 7 of the roll-over bar 5 are helical springs arranged in the interior of the stand pipes 14 and surround a spring guiding pin 38 which has a pressure disk 39 on its top.

Preferably, the stand pipes 14 have slide bushes 40 for the legs 6 of the roll-over bar 5 above and below the receiving bushes 18 of the transverse plate 16. By means of their interior surfaces, the legs 6 slide on the end-side beads of the slide bushes 40.

When the roll-over bar is released by the swivelling-back of the holding bolt 27 and is accelerated in the upward direction by the springs 7 and 37, at the end of the lifting movement, the above-described detent pawl 25 runs against a toothed detent strip 41 which, by way of a correspondingly constructed opening 13", is supported in the housing 4 by means of a corresponding projection and is also fastened to the housing 4 by means of screws. After the detent pawl 25 has engaged in one of the teeth of the detent strip 41, the transverse yoke 20 and therefore also the roll-over bar 5 is fixed in its supporting position projecting in the upward direction. In order to be able to release the locking of the roll-over bar 5 which has then taken place, a slide 43 is provided which is equipped with a grip 42 and which, by way of a narrow correspondingly developed opening, can be slid from above over the teeth of the detent strip 41 and therefore lifts the detent pawl 25 off the teeth of the detent strip 41. The roll-over bar 5 can then without substantial effort be pushed back manually into the cassette-type housing 4 until it is locked there.

Because, among other parts, the legs 6 of the roll-over bar 5 are also made from extruded profiles, it is easily possible to provide the legs of the roll-over bar with a long stretched-out cross-section. The longer cross-sectional dimension will then extend in the direction in which the highest stresses occur. As illustrated in FIG. 9, in this case, each leg 6 may have an approximately oval exterior shape in its cross-section. The interior wall of the leg 6 may also have an approximately oval or a round cross-section. In this manner, cross-sectional accumulations may be implemented in a very targeted manner and permit an optimization with respect to the stability.

By means of the almost exclusive use of extruded profiles which are fitted into one another or slide into one another, considerable weight can be saved, whereby in addition to a noticeable reduction in cost, safety is still to be ensured. The use of extruded profiles finally permits the changing of the roll-over protection system with respect to its height without any major tool expenditures and to therefore adapt it, if necessary, to differently conceived vehicle bodies. Some of the used extruded profile parts must only be cut off at a different length.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A roll-over protection arrangement for a motor vehicle which has a vehicle railing extending along at least portions of a passenger accommodating area, said roll-over protection arrangement comprising:

an approximately U-shaped roll-over bar having downwardly directed U-legs and an upper bridging portion between top portions of the U-legs, a guiding arrangement for supportably guiding the U-shaped roll-over bar for movement between a downward inoperative position for normal driving operations and an upper operative position above the vehicle railing for protecting vehicle passengers in the event of a vehicle roll-over, said guiding arrangement including guiding elements slidably engageable with the U-legs, a releasable holding device for holding the U-legs in the downward position, a locking device for locking the U-legs in the upper position, and a force-applying mechanism for rapidly moving the U-shaped roll-over bar from the downward position to the upper position, wherein the U-legs and the guiding elements are made from extruded profile aluminum alloy or other light weight material members, which are fitted to slidably engage with one another during respective movements between the downward and upper positions.

2. An arrangement according to claim 1, wherein the guiding elements are arranged on a housing which is essentially formed from an extruded profile and can be fastened to an approximately vertically extending vehicle body wall.

3. An arrangement according to claim 2, wherein the guiding elements comprise two stand pipes made of an extruded profile which are fastened to the housing by means of their lower end.

4. An arrangement according to claim 1, wherein the lower ends of the legs are connected with one another by means of a transverse yoke when in an installed position on a vehicle.

5. A roll-over protection arrangement for a motor vehicle which has a vehicle railing extending along at least portions of a passenger accommodating area, said roll-over protection arrangement comprising:

an approximately U-shaped roll-over bar having downwardly directed U-legs and an upper bridging portion between top portions of the U-legs, a guiding arrangement for supportably guiding the U-shaped roll-over bar for movement between a downward inoperative position for normal driving operations and an upper operative position above the vehicle railing for protecting vehicle passengers in the event of a vehicle rollr-over, said guiding arrangement including guiding elements slidably engageable with the U-legs, a releasable holding device for holding the U-legs in the downward position, a locking device for locking the U-legs in the upper position, and a force-applying mechanism for rapidly moving the U-shaped roll-over bar from the downward position to the upper position, wherein the U-legs and the guiding elements are made from extruded profile members, wherein the lower ends of the legs are connected with one another by means of a transverse yoke when in an installed position on a vehicle, and wherein the transverse yoke is made of an extruded profile and includes a transverse web, receiving bushes which enclose the leg ends being provided on ends of the transverse web.

6. An arrangement according to claim 5, wherein vertically extending cheeks for the bearing of a spring-loaded detent pawl are provided on the transverse web.

7. An arrangement according to claim 5, wherein a holding block made of an extruded profile is arranged on the transverse web for the engagement of a holding bolt disposed on the housing.

8. An arrangement according to claim 7, wherein a holding rocker is disposed on the holding block which has a transverse pin so that it can be swivelled about a transverse axis for the engagement for the holding bolt.

9. An arrangement according to claim 7, wherein the holding bolt is disposed in a holding console which can be fastened to the housing, carries an actuator and has slots for the entering of the holding rocker which are open toward the top and widen toward the top.

10. An arrangement according to claim 9, wherein the slots are constructed in two vertically extending ribs of the holding console constructed from an extruded profile which, when the roll-over bar is lowered, engage in a passage of the holding block which is open toward the bottom.

11. A roll-over protection arrangement for a motor vehicle which has a vehicle railing extending along at least portions of a passenger accommodating area, said roll-over protection arrangement comprising:

an approximately U-shaped roll-over bar having downwardly directed U-legs and an upper bridging portion between top portions of the U-legs, a guiding arrangement for supportably guiding the U-shaped roll-over bar for movement between a downward inoperative position for normal driving operations and an upper operative position above the vehicle railing for protecting vehicle passengers in the event of a vehicle roll-over, said guiding arrangement including guiding elements slidably engageable with the U-legs, a releasable holding device for holding the U-legs in the downward position, a locking device for locking the U-legs in the upper position, and a force-applying mechanism for rapidly moving the U-shaped roll-over bar from the downward position to the upper position, wherein the U-legs and the guiding elements are made from extruded profile members, wherein the guiding elements comprise two stand pipes made of an extruded profile which are fastened to the housing by means of their lower end, and wherein the stand pipes are surrounded on the bottom by centering cones which are supported on the housing bottom by way of springs.

12. An arrangement according to claim 6, wherein the force applying mechanism includes ejecting spring devices, and wherein the ejecting spring devices include helical springs arranged in the interior of the stand pipes and surrounding a spring guiding bolt which has a pressure disk on its top.

13. An arrangement according to claim 1, wherein the legs of the roll-over bar have a long stretched-out cross-section.

14. An arrangement according to claim 13, wherein the legs have an approximately oval outer shape in their cross-section.

15. An arrangement according to claim 13, wherein the interior wall of the legs is approximately oval in its cross-section.

16. An arrangement according to claim 14, wherein the interior wall of the legs is approximately oval in its cross-section.

17. An arrangement according to claim 1, wherein the force applying mechanism includes a spring device.

18. An arrangement according to claim 1, wherein the motor vehicle is a convertible with two rear passenger seats, and wherein one of said roll-over bars is disposed behind each of the rear passenger seats.

19. A roll-over protection arrangement for a motor vehicle which has a vehicle railing extending along at least portions of a passenger accommodating area, said roll-over protection arrangement comprising:

an approximately U-shaped roll-over bar having downwardly directed U-legs and an upper bridging portion between top portions of the U-legs, a guiding arrangement for supportably guiding the U-shaped roll-over bar for movement between a downward inoperative position for normal driving operations and an upper operative position above the vehicle railing for protecting vehicle passengers in the event of a vehicle roll-over, said guiding arrangement including guiding elements slidably engageable with the U-legs, a releasable holding device for holding the U-legs in the downward position, a locking device for locking the U-legs in the upper position, and a force-applying mechanism for rapidly moving the U-shaped roll-over bar from the downward position to the upper position, wherein the U-legs and the guiding elements are made from extruded profile members, wherein the guiding elements are arranged on a housing which is essentially formed from an extruded profile and can be fastened to an approximately vertically extending vehicle body wall, wherein the guiding elements comprise two stand pipes made of an extruded profile which are fastened to the housing by means of their lower end, and wherein the stand pipes are held on their upper ends by a transverse plate made of an extruded profile arranged on the housing which by way of a connecting web carries two receiving bushes for the stand pipes.

20. An arrangement according to claim 19, wherein the legs of the roll-over bar are provided on their side facing the transverse plate with longitudinal slots for the passing-through of the connecting webs.

21. An arrangement according to claim 19, wherein the stand pipes are provided above and below receiving bushes of the transverse plate on the outside with slide bushes for the legs of the roll-over bar.

22. A roll-over protection arrangement for a motor vehicle which has a vehicle railing extending along at least portions of a passenger accommodating area, said roll-over protection arrangement comprising:

a roll-over bar having downwardly directed legs and an upper bridging portion between top portions of the legs, a guiding arrangement supportably guiding movement of the legs between a downward inoperative position for normal driving operations and an upper operative position above the vehicle railing for protecting vehicle passengers in the event of a vehicle roll-over, said guiding arrangement including guiding elements slideably engageable with the legs, a downward position leg holding device, an upper position leg holding device, and a force-applying mechanism disposed to move the roll-over bar from the downward position to the upper position, wherein said roll-over bar and guiding arrangement are supported in a cassette housing which in use is disposed separate from vehicle passenger seats and adjacent the passenger accommodating area, said cassette housing including a housing floor at its bottom, and wherein said guiding elements include respective standpipes fastened to the housing floor.

23. An arrangement according to claim 22, wherein said standpipes have a non-circular cross-sectional shape which is matched with a corresponding non-circular cross-sectional shape of said legs.

24. An arrangement according to claim 23, wherein said non-circular cross-sectional shape is an oval shape.

25. An arrangement according to claim 22, wherein said force applying mechanism includes springs disposed in the respective standpipes.

26. An arrangement according to claim 25, wherein said springs include two springs in each standpipe.

27. An arrangement according to claim 26, wherein lower ones of said springs are disposed adjacent threaded fasteners holding the respective standpipes at said housing floor.

28. An arrangement according to claim 27, comprising leg centering means disposed between the lower ones of said springs and bottom ends of said legs.

29. An arrangement according to claim 28, wherein said leg centering means are centering cones.

30. An arrangement according to claim 22, wherein the motor vehicle is a convertible with two rear passenger seat and wherein one of said roll-over bars is disposed behind each of the rear passenger seats.

* * * * *